(12) United States Patent
Vasquez et al.

(10) Patent No.: US 12,265,662 B2
(45) Date of Patent: Apr. 1, 2025

(54) DEVICE FOR REPRODUCING A HEARTBEAT PATTERN TO MEMORIALIZE A LOVED ONE

(71) Applicants: Juan Jesus Vasquez, Carrollton, TX (US); Juan Daniel Vasquez, Carrollton, TX (US); Alec Voldis Vasquez, Carrollton, TX (US); David Adrian Vasquez, Carrollton, TX (US); Tatjana Vasquez, Carrollton, TX (US); Stephanie Garcia, Fort Worth, TX (US)

(72) Inventors: Juan Jesus Vasquez, Carrollton, TX (US); Juan Daniel Vasquez, Carrollton, TX (US); Alec Voldis Vasquez, Carrollton, TX (US); David Adrian Vasquez, Carrollton, TX (US); Tatjana Vasquez, Carrollton, TX (US); Stephanie Garcia, Fort Worth, TX (US)

( * ) Notice: Subject to any disclaimer, the term of this patent is extended or adjusted under 35 U.S.C. 154(b) by 68 days.

(21) Appl. No.: 18/315,763

(22) Filed: May 11, 2023

(65) Prior Publication Data

US 2023/0393660 A1 Dec. 7, 2023

Related U.S. Application Data

(60) Provisional application No. 63/347,953, filed on Jun. 1, 2022.

(51) Int. Cl.
*G06F 3/01* (2006.01)
*G06F 3/16* (2006.01)

(52) U.S. Cl.
CPC .............. *G06F 3/016* (2013.01); *G06F 3/16* (2013.01)

(58) Field of Classification Search
CPC ........... G06F 3/016; G06F 3/16; A63H 3/001; A63H 3/28
See application file for complete search history.

(56) References Cited

U.S. PATENT DOCUMENTS

| | | | | |
|---|---|---|---|---|
| 5,256,098 | A * | 10/1993 | Smith | A63H 3/001 446/295 |
| 11,392,194 | B1 * | 7/2022 | Kundra | H04L 65/1069 |
| 2015/0287293 | A1 * | 10/2015 | Grant | G08B 6/00 340/407.1 |

(Continued)

*Primary Examiner* — Hongmin Fan
(74) *Attorney, Agent, or Firm* — Whitaker Chalk Swindle & Schwartz PLLC; Juan Vasquez

(57) ABSTRACT

Devices, systems, and methods for reproducing or simulating a heartbeat pattern in accordance with aspects of the present disclosure. In particular aspects, a device is configured to reproduce a tactile, auditory, and/or visual output representing a heartbeat pattern of a loved one. A user may perceive, during operation, the reproduced heartbeat pattern reproduced by the device. For example, the user may touch the device (e.g., may wrap a hand around the device, may pressed the device against any part of the user's body, etc.), the device may be activated (e.g., by the user's touch) and may reproduce an output (e.g., tactile, auditory, and/or visual) causing the user to perceive the heartbeat pattern. The heartbeat pattern may be one stored in the device, an external device and provided to the device via a link, or generated by the device dynamically during operation.

16 Claims, 10 Drawing Sheets

(56) References Cited

U.S. PATENT DOCUMENTS

| | | | |
|---|---|---|---|
| 2019/0212824 A1* | 7/2019 | Keller | G06F 3/016 |
| 2019/0223798 A1* | 7/2019 | Eriguchi | H04H 60/33 |
| 2019/0224444 A1* | 7/2019 | Kalensky | A63H 3/28 |

* cited by examiner

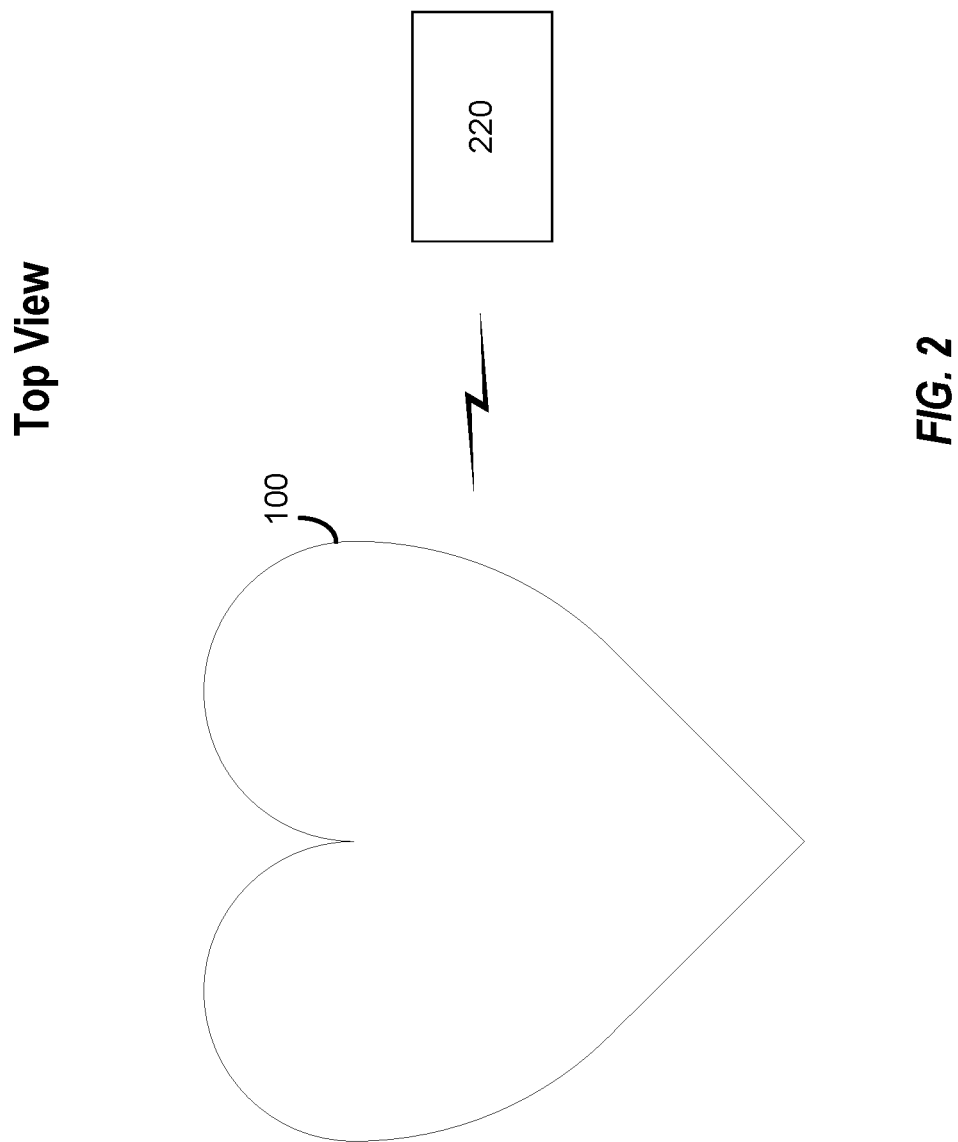

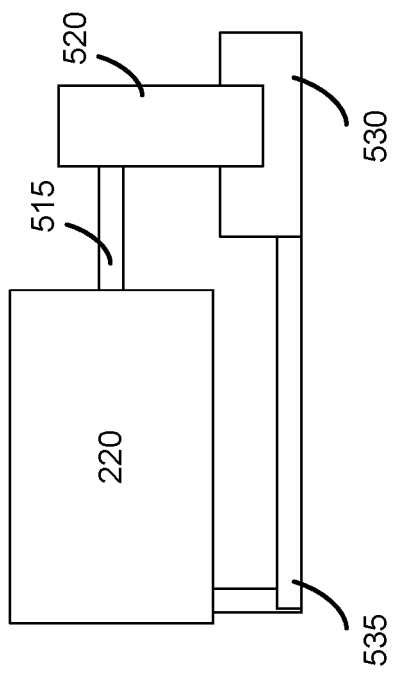
FIG. 5B
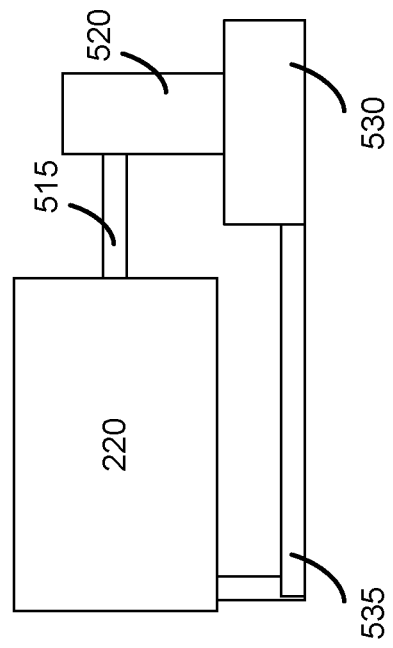
FIG. 5C
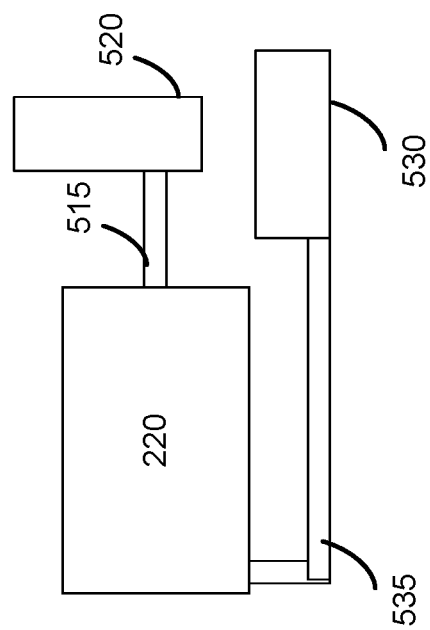
FIG. 5A

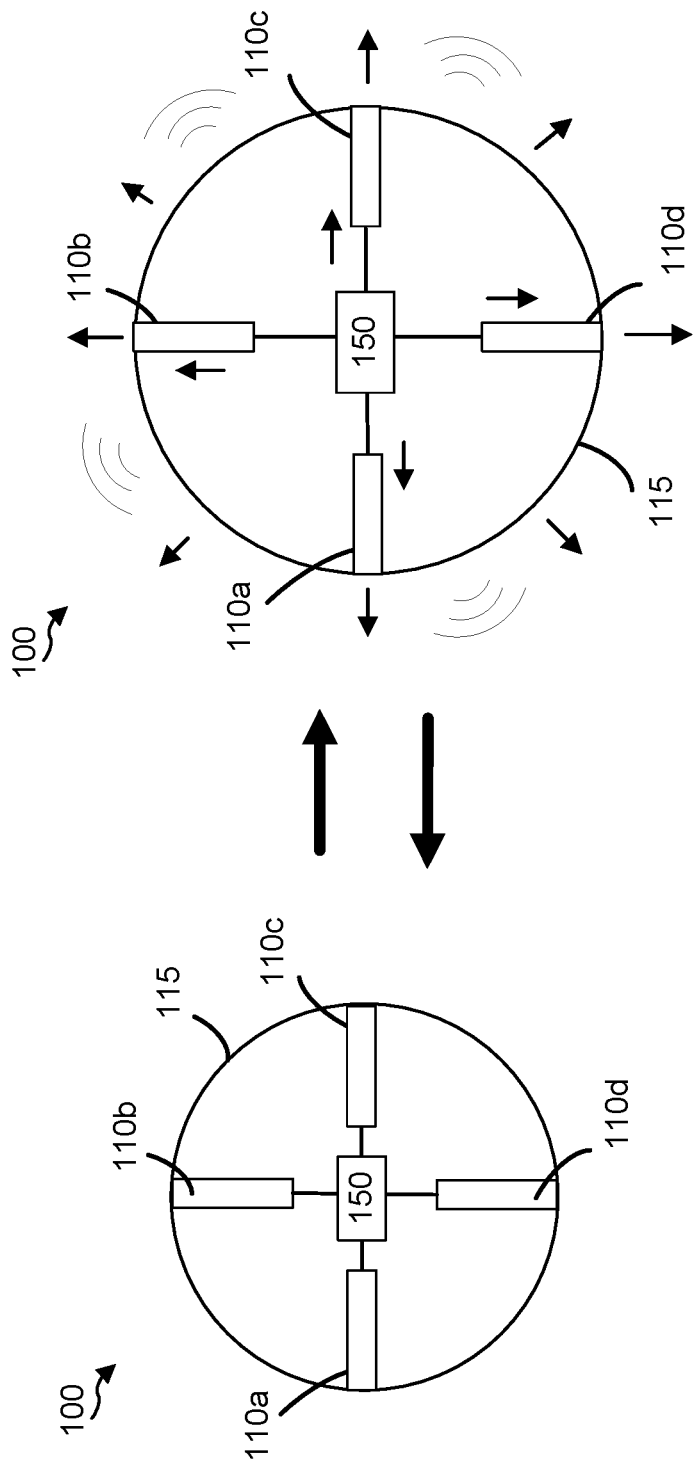

DEVICE FOR REPRODUCING A HEARTBEAT PATTERN TO MEMORIALIZE A LOVED ONE

BACKGROUND

Field

Aspects of the present disclosure relate generally to heartbeat simulators, and more particularly, to a device for memorializing a loved one by reproducing a heartbeat pattern with tactile, visual and/or audible output.

Background

Life is made up of memories. We remember significant and insignificant events and we know that we have had a life by those memories. We connect to ourselves through our memories. And this connection is strongest when it comes to loved ones. We are connected to our loved ones through our memories of them. The memories can be anything that reminds us of our loved ones, whether they are far away from us, or whether they are no longer with us. For example, a photograph, a video, a voice message, a note, etc., can remind us of a loved one (e.g., a person, such as a relative, a friend, a love, a pet, etc.), and any of those can connect us to our loved ones through the memories they elicit.

There are currently many devices to memorialize loved ones, such as cameras, video cameras, digital photograph frames. However, there are currently very limited solutions for memorializing a loved via a device for reproducing a heartbeat pattern. Even more, what few solutions there are, they lack robust functionality. For example, current systems are not able to address the situation where obtaining the loved one's heartbeat pattern is not possible (e.g., the loved one has passed away, unavailable, away, or there is simply no equipment for collecting the heartbeat pattern).

SUMMARY

Embodiments of the present disclosure provide a device for simulating a heartbeat pattern. In particular, aspects of the present disclosure provide a device that provides a tactile, auditory, and/or visual output representing a heartbeat pattern of a loved one. A user may perceive, during operation, the reproduced heartbeat pattern from the device. For example, the user may touch the device (e.g., may wrap a hand around the device, may pressed the device against any part of the user's body, etc.), the device may be activated (e.g., by the user's touch) and may reproduce an output (e.g., tactile, auditory, and/or visual) causing the user to perceive the heartbeat pattern. The heartbeat pattern may be one stored in the device, an external device and provided to the device via a link, or generated by the device dynamically during operation. The reproduced heartbeat pattern may be a heartbeat pattern collected from the loved one (e.g., using a device for detecting a heartbeat and recording the detected heartbeat pattern) and reproducing it using the device. In aspects, the heartbeat pattern reproduced using the device of embodiments may be a simulated heartbeat pattern generated from one or more physiological characteristics of the loved one. For example, a physiological characteristic may be measured, detected, obtained, etc., and one or more algorithms may be applied to the physiological characteristic to generate a simulated heartbeat pattern. The simulated heartbeat pattern generated based on the one or more physiological characteristic of the loved one may be unique to the loved one, as the one or more algorithms may be configured such that the resulting simulated heartbeat pattern is unique to the user. The simulated heartbeat pattern may be reproduced using the device of embodiments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention

BRIEF DESCRIPTION OF THE DRAWINGS

For a more complete understanding of the present invention, reference is now made to the following descriptions taken in conjunction with the accompanying drawings, in which:

FIG. 2 is a block diagram showing an example of I/O operations of heartbeat simulator device 100 with an external device in accordance with embodiments of the present disclosure.

FIG. 5A-5C are block diagrams illustrating a technique for reproducing a heartbeat pattern tactilely using a striker and slab in accordance with embodiments of the present disclosure.

FIGS. 6A and 6B are block diagrams illustrating a technique for reproducing a heartbeat pattern tactilely using a flexible shell and expanding actuators in accordance with embodiments of the present disclosure.

Figure 1:
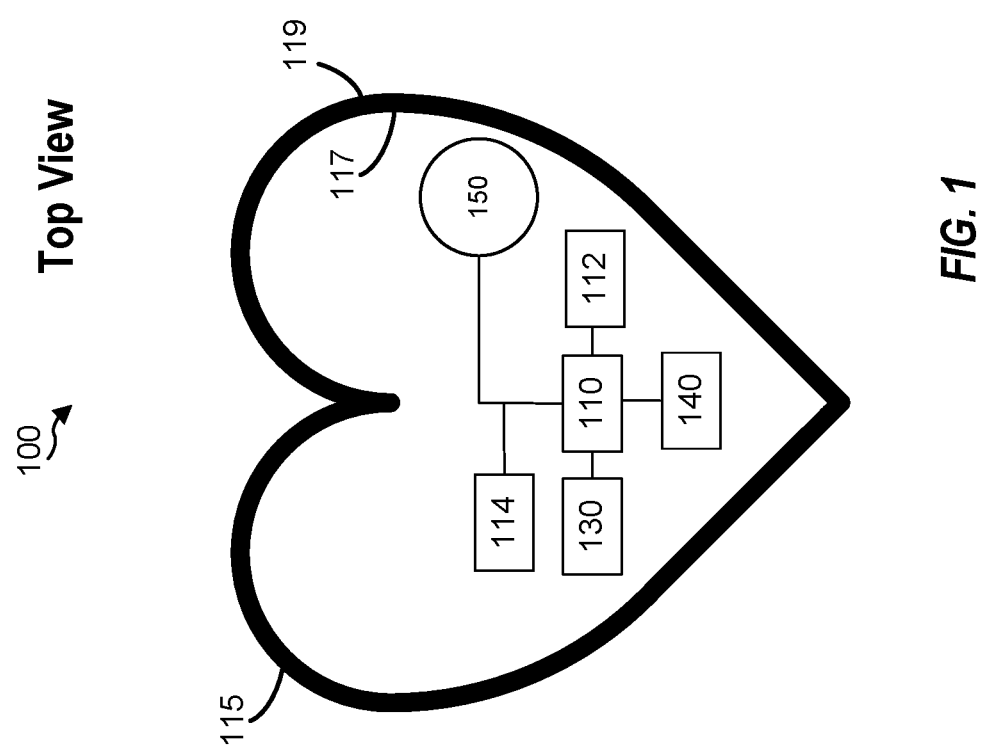
FIG. 1 is a block diagram of an exemplary heartbeat simulator device 100 configured with capabilities and functionality for reproducing a heartbeat pattern in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

In one particular case, a heartbeat simulator device implemented in accordance with aspects of the present disclosure may be configured to reproduce a heartbeat of person or pet (e.g., a loved one) by simulating a heartbeat pattern associated with the loved one to be perceived by a user. As used herein, a loved one may be a person or a pet whose heartbeat pattern (or heartbeat pattern simulation generated based on physiological characteristics) is to be preserved or memorialized by the heartbeat simulator device of embodiments. In embodiments, the heartbeat pattern (which herein may refer to a heartbeat pattern corresponding to the heartbeat pattern of the loved one or may refer to a heartbeat pattern generated based on a physiological characteristic of the loved one in accordance embodiments) may be obtained and the heartbeat simulator device may be configured to reproduce the heartbeat pattern in accordance with aspects described herein.

As used herein, a heartbeat pattern may refer to a series or sequence of heartbeats. Each heartbeat may include at least one peak and at least one trough or pause. A peak portion of a heartbeat may also be referred to as a beat, a pulse, a peak, etc., whereas the trough or pause portion may be referred to as a low, a trough, a valley, etc. In aspects, the peak and trough of a heartbeat in the heartbeat simulator device of embodiments may represent the heartbeat pulses and pauses of a real heart heartbeat action.

A cycle of a real heart works in the following manner. The ventricles (one on each side of the heart, separated by a wall) relax (e.g., the muscle of the heart relaxes or ceases to be contracted) to allow blood to flow into the ventricles through the atria from the veins. Then the atria contract (e.g., contraction caused by an electric pulse) to force additional blood into the ventricles. The ventricles then contract (e.g., contraction caused by an electric pulse) to pump blood out of the heart through the arteries. The ventricles then relax beginning the cycle again. During the cycle, blood flows from the atria to the ventricles via a first set of valves, and flow out from the ventricles to the arteries via a second set of valves. While the first set of valves are closed, the second set of valves are open, and while the second set of valves are closed, the first set of valves are open. When the ventricles are contracted, this contraction causes the first set of valves to snap close and the second set of valves to open. The closing of the first set of valves and opening of the second set of valves cause the "lub" portion of the characteristic lub-dub sound of a heartbeat. When the ventricles cease to be contracted or become relaxed, the second set of valves snap close and the first set of valves open. The closing of the second set of valves and opening of the first set of valves cause the "dub" portion of the lub-dub sound. It is also noted that in a heartbeat, there is a single beat, caused by the contraction of the ventricles. This single beat can be felt tactiley, but it is typically not a lub-dub pulse, but merely a "lub." The inventors have found that a heartbeat simulation in the form of a lub-dub sound creates a more "real" simulation, as it is related, in the mind of the person feeling the pulse, to the characteristic lub-dub action of a heartbeat. Although the description that follows focuses on a heartbeat pulse simulation in the form of a lub-dub pattern, or a first and second beat or pulse, it will be appreciated that some embodiments may operate to generate a heartbeat simulation by reproducing a heartbeat with a single beat, rather than a lub-dub patterned heartbeat.

It is noted that in some cases, a recorded or captured heartbeat may not be in the form of a lub-dub pattern. For example, the heartbeat pattern of a baby in the womb may not be able to be recorded as a characteristic lub-dub because ultrasounds typically only capture the actual beat (e.g., single beat) of the baby's heartbeat. In some cases, the heartbeat may be captured using a tactile sensor, rather than an auditory sensor, in which case the captured heartbeat may be in the form of a lub pattern. In this case, aspects of the present disclosure may include functionality to convert the single lub heartbeat into a lub-dub pattern by adding a "dub" portion to the lub pattern. The position of the dub portion within the heartbeat (e.g., including the pulse between the lub and the dub) may be calculated or inferred from the position of the lub.

In aspects, the heartbeat pattern to be reproduced by the heartbeat simulator device of embodiments may be characterized by the configuration of the heartbeats making up the heartbeat pattern. For example, the heartbeat pattern may be characterized by one or more of the intensity of the heartbeats (e.g., the force of the heartbeat pulse or beat, the volume of the audio feedback of the pulse, the intensity of the visual pulse, etc.), the length of the heartbeat pulse, the length of the pause, the number of heartbeat pulses, etc. In this manner, a first heartbeat pattern may have a number of heartbeats of particular intensity (or each heartbeat of varying intensity) and a number of pauses between the pulses (e.g., of varying lengths), whereas a second heartbeat pattern may have different characteristics (e.g., different number of pulses, different intensities, different lengths of the pulses and/or of the pauses between the pulses, etc.). Additionally, or alternatively, the heartbeat simulator may simulate a heartbeat by first generating a strong pulse followed by a first pause, followed by a light pulse of lesser intensity (and/or lesser duration, and/or higher pitch) than the strong pulse, followed by a second pause of longer duration from the first pause. In this manner, the heartbeat simulator device may reproduced a lub-dub heartbeat pattern.

FIG. 1 is a block diagram of an exemplary heartbeat simulator device 100 configured with capabilities and functionality for reproducing a heartbeat pattern in accordance with embodiments of the present disclosure. As shown in FIG. 1, heartbeat simulator device 100 may include tactile feedback generator 150, audio/visual feedback generator 140, input/output (I/O) module 130, processor 110, memory 112, and power source 114. In aspects, the components of heartbeat simulator device 100, or a subset of the components of heartbeat simulator device 100, may be disposed, entirely or in part, within shell 115.

In aspects, shell 115 may be composed of inner surface 117 and outer surface 119. In aspects, a material (e.g., silicone, a precious metal, a sleeve, or any other material) may surround, entirely or partially, shell 115. Shell 115 may be composed of a rigid material, such as a metal, epoxy, polyurethane, plastic, or any other material that provides rigidity. The rigid material may be configured in such a manner as to facilitate the transmission of tactile waves or vibrations from inner surface 117 to outer surface 119. For example, a contact pulse against inner surface 117 (e.g., a hit from a hammer component against inner surface 117) may cause a vibration to propagate through shell 115 so that it may be perceived (e.g., felt) on outer surface 119.

In aspects, shell 115 may be made of a flexible, soft, and/or elastic material, such as a silicone-based material), which may be configured to move (e.g., expand and/or contract). In this manner, a "heartbeat" may be simulated by expanding shell 115 (e.g., by providing an expanding force) and then contracting it (e.g., by removing the contracting force which, due to the elasticity of shell 115 may cause shell 115 to contract, or by applying a contracting force against shell 115).

The components of heartbeat simulator device 100 may cooperatively operate to provide functionality in accordance with aspects of the present disclosure.

It is noted that the functional blocks, and components thereof, of heartbeat simulator device 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for performing the functions described herein.

Processor 110 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 110 may comprise code segments (e.g., software, firmware, and/or hardware logic) executable in hardware, such as a processor, to perform the tasks and functions described herein. In yet other aspects, processor 110 may be implemented as a combination of hardware and software. Processor 110 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 110), perform tasks and functions as described herein. Memory 112 may also be configured to facilitate storage operations. For example, memory 112 may provide functionality for storing various information related to operations of heartbeat simulator device 100. For example, memory 112 may store heartbeat patterns for reproduction by heartbeat simulator device 100.

Power source 114 may be configured to provide power to the component of heartbeat simulator device 100. In aspects, power source 114 may include a battery. In aspects, the battery may be rechargeable, and in these cases, power source 114 may include circuitry for recharging the battery (e.g., a connector for connecting a charging cable as well as control circuitry for managing the recharging of the battery). In aspects, power source 114 may also include functionality for managing the power usage of heartbeat simulator device 100 in order to conserve power. For example, power source 114 may include controls for deactivating the heartbeat simulator device 100 after a certain period of time. For example, upon activation to reproduce a heartbeat pattern, the heartbeat simulator device 100 may be stopped after expiration of a timer to conserve power. The stopping may also be based on a determination as to whether heartbeat simulator device 100 is being used by a user (e.g., a user may be actively using heartbeat simulator device 100, such as by touching heartbeat simulator device 100, wrapping a hand around heartbeat simulator device 100, or pressing heartbeat simulator device 100 against a part of the user's body (e.g., the user's chest)).

I/O module 130 may be configured to provide functionality for heartbeat simulator device 100 to provide and/or to receive outputs and/or inputs. For example, I/O module 130 may provide an interface for heartbeat simulator device 100 to communicate with an external device. In aspects, I/O module 130 may provide communications via Bluetooth, WiFi, near-field communication (NFC), radio frequency (NF) communications, and/or other equivalent means that provide ability to transmit and/or receive data to and/or from and external device or devices. I/O module 130 may enable heartbeat simulator device 100 to provide feedback to the external device (such as diagnostics data, battery level, information on stored heartbeat patterns, errors, etc.). FIG. 2 is a block diagram showing an example of I/O operations of heartbeat simulator device 100 with an external device in accordance with embodiments of the present disclosure. As shown, heartbeat simulator device 100 may communicatively connect with external device 220 (e.g., via I/O module 130).

External device 220 may include a user device. The user device included in external device 220 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. The user device included in external device 220 may be configured to provide input/output functionality to allow users of heartbeat simulator device 100 to provide inputs related to the functionality of heartbeat simulator device 100. For example, users may input user information related to a user profile, may select a heartbeat pattern for reproduction by heartbeat simulator device 100, may provide functionality to collect and store heartbeat patterns (e.g., using a heartbeat collection module, such as a stethoscopic device communicatively coupled to external device 220, or in some aspects, the stethoscopic device may be communicatively coupled directly to heartbeat simulator device 100), may transmit stored heartbeat patterns to heartbeat simulator device 100 (e.g., stored heartbeat patterns collected using the stethoscopic device, or stored heartbeat patterns generated using the heartbeat pattern generating techniques discussed herein, such as based on physiological characteristics).

With reference back to FIG. 1, heartbeat simulator device 100 may include audio/visual feedback generator 140. Audio/visual feedback generator 140 may be configured to reproduce a heartbeat pattern using audio and/or visual signals. For example, the heartbeat pattern may be reproduced by playing a sound corresponding to the sound of the heartbeats in the heartbeat pattern, or may include causing a light to light up and light off according to the peaks and trough of the heartbeat pattern (e.g., a peak may correspond to a light on, and a trough may correspond to a light off). In this manner, the audio/visual feedback generator 140 may provide functionality enabling a user to perceive the heartbeat pattern auditorily and/or visually. In aspects, the auditory output may include a voice message (e.g., a voice message of the loved one) or may include music or other soothing sounds, which may be played concurrently with the tactile output representing the loved one's heartbeat. A visual output may also be provided, such as with a light source simulating the beats. As noted above, the heartbeat pattern may include heartbeats configured in the lub-dub pattern.

Tactile feedback generator 150 may be configured to tactilely reproduce a heartbeat pattern by providing a tactile output representing the heartbeat pattern to be reproduced. The tactile output may be perceived tactilely by the user and in this manner the user may "feel" the heartbeat pattern. For example, a user may wrap a hand around heartbeat simulator device 100 or may press heartbeat simulator device 100 against a body part (e.g., the chest, or any other body part or extremity) and, upon activation, the user may feel the heartbeat pattern (e.g., on the wrapped hand or on the pressed body part as well as the hand).

FIGS. 3A-8A provide various examples of techniques for reproducing a heartbeat pattern tactilely. It should be appreciated that the examples illustrated in FIGS. 3A-8A are provided for illustrative purposes and should not be construed as limiting in any way. Indeed, aspects of the present disclosure are applicable in situations in which other techniques for reproducing a heartbeat tactilely may be used. In general, heartbeat simulator device 100 may operate to reproduce a heartbeat as a lub-dub pattern. For example, heartbeat simulator device 100 may operate to reproduce a heartbeat by causing a first beat to be reproduced, pausing for a duration of a first pause, causing a second beat to be reproduced, then pausing for a duration of a second pause. In this case, a pause may be a duration during which no beats are simulated. This process may be repeated in accordance with the heartbeat pattern to be reproduced. In aspects, the intensity of the first and second beats, and/or the lengths of the first and/or second pauses may be determined by the configuration of the heartbeat and/or heartbeat pattern to be reproduced. The values of the first and second beats, and/or the lengths of the first and/or second pauses may vary within the heartbeat, and/or within the heartbeat pattern, such that the first beat may have a different intensity from the second beat, and/or the first pause may have a different duration from the second pause within a heartbeat, and/or such that a first heartbeat may be a first configuration (e.g., values for the first and second beats and/or first and second pauses) and a second heartbeat may have a second configuration different from the first configuration within a heartbeat pattern. In some aspects, all the heartbeats within a pattern may have the same configuration. In this manner, heartbeat simulator device 100 may simulate a heartbeat pattern.

FIGS. 3A-3D, 4A-4C, 7A, and 7B are block diagrams illustrating a technique for reproducing a heartbeat pattern tactilely using one or more hammers in accordance with embodiments of the present disclosure. As shown, heartbeat simulator device 100 may include shell 115, tactile feedback generator 150, and one or more hammers 110 (e.g., hammers 110a and/or 110b). In aspects, each of the one or more hammers 110 may be connected to a swing arm 120 (e.g., hammers 110a and/or 110b may be connected to swing arms 120a and/or 120b, respectively). In aspects, generating a heartbeat (e.g., a heartbeat that is part of a heartbeat pattern) may include tactile feedback generator 150 actuating one or both of swing arms to swing the swing arm such that the hammer attached to the actuated hammer is caused to strike against the inner surface of shell 115. For example, feedback generator 150 may actuate (e.g., using a motor, solenoid, or other means of swinging the swing arm) one or both of swing arms to swing the swing arm such that the hammer attached to the actuated hammer is caused to strike against the inner surface of shell 115 in order to generate a beat. In aspects, such as illustrated in the examples shown in FIGS. 3A and 3B, heartbeat simulator device 100 may operate to reproduce a heartbeat by swinging both hammers 110a and 110b against the inner surface of shell 115 to cause a first strike, pausing for a duration of a first pause, causing a second strike against the inner surface of shell 115 by swinging hammers 110a and 110b against the inner surface of shell 115, then pausing for a duration of a second pause. This process may be repeated in accordance with the heartbeat pattern to be reproduced. In aspects, the intensity of the first and second strike, and/or the lengths of the first and/or second pauses may be determined by the configuration of the heartbeat and/or heartbeat pattern to be reproduced. In this manner, heartbeat simulator device 100 may reproduce or simulate a heartbeat pattern.

Figure 3B:
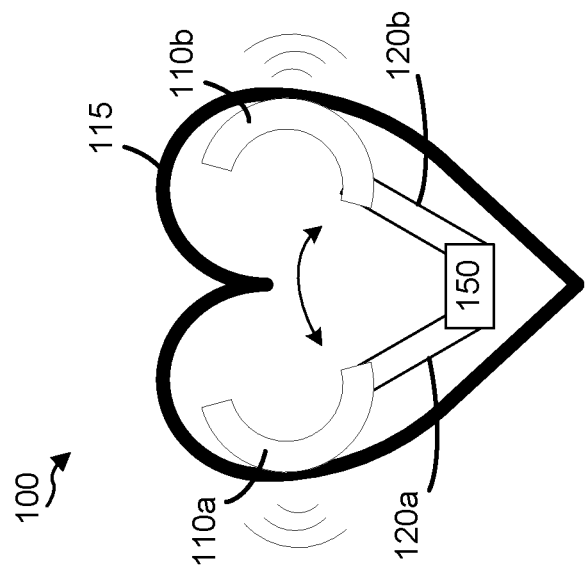
FIGS. 3A-3D, 4A-4C, 7A, and 7B are block diagrams illustrating a technique for reproducing a heartbeat pattern tactilely using one or more hammers in accordance with embodiments of the present disclosure.
Figure 3A:
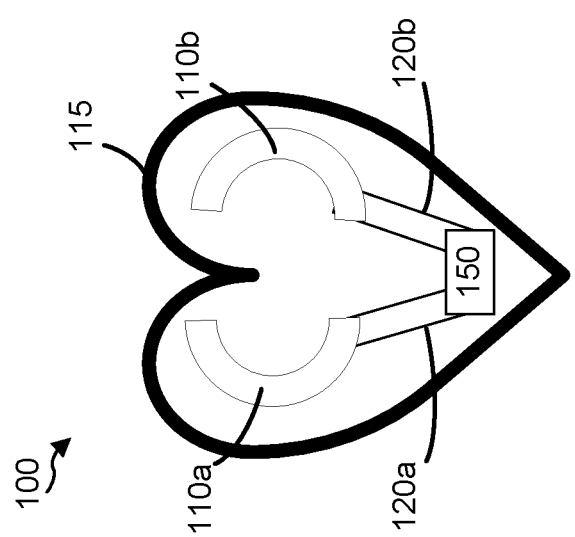
Figure 3D:
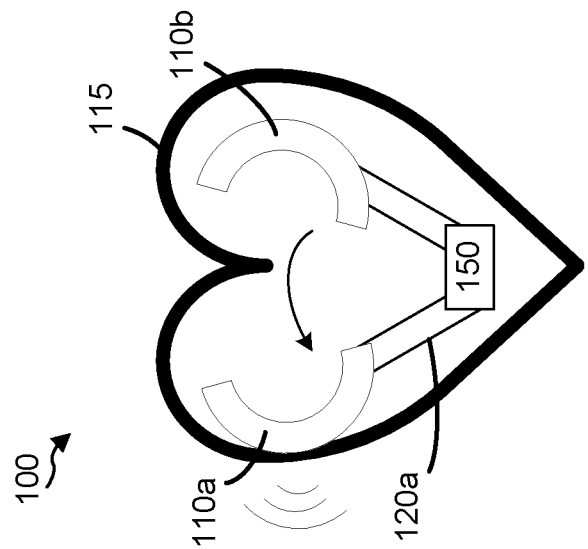
Figure 3C:
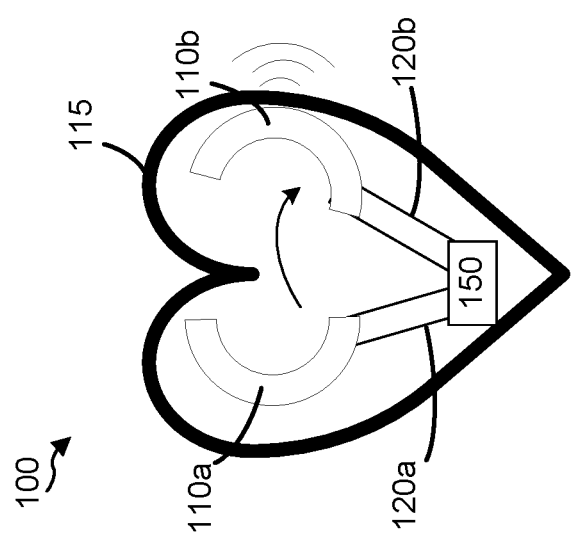

In aspects, such as illustrated in the examples shown in FIGS. 3C and 3C, heartbeat simulator device 100 may operate to reproduce a heartbeat by first swinging one of hammers, for example hammer 110b (as a non-limiting example) against the inner surface of shell 115 to cause a first strike against one portion of the inner surface of shell 115, pausing for a duration of a first pause, swinging the other one of hammers, for example hammer 110a (as a non-limiting example) against the inner surface of shell 115 to cause a second strike against another portion of the inner surface of shell 115, then pausing for a duration of a second pause. In aspects, the intensity of the first strike may be different than the intensity of the second strike (e.g., may be higher or lower) to simulate a lub-dub pattern beat, and/or the duration of the first pause may be different from the duration of the second pause (e.g., may be shorter or longer) to simulate a heartbeat. This process may be repeated in accordance with the heartbeat pattern to be reproduced or simulated. In aspects, the intensity of the first and second strike, and/or the lengths of the first and/or second pauses may be determined by the configuration of the heartbeat and/or heartbeat pattern to be reproduced. In this manner, heartbeat simulator device 100 may reproduced or simulate a heartbeat pattern.

Figure 7A:
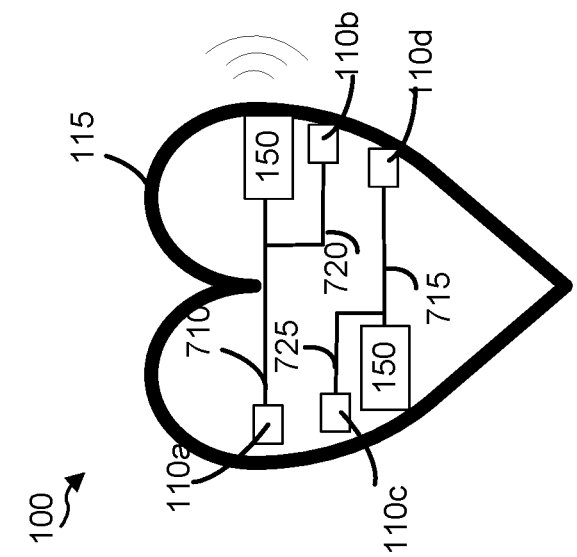
Figure 7B:
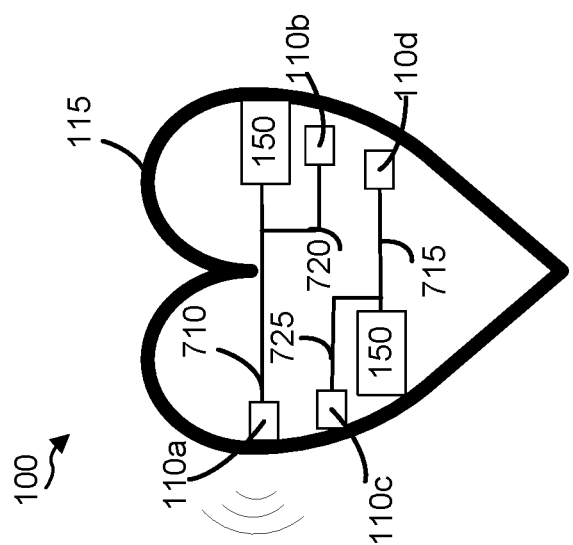

In aspects, such as illustrated in the examples shown in FIGS. 7A and 7B, two hammers 110a and 110b may be attached to each other (e.g., via connecting arms 710 and 720) and disposed a different portions of heartbeat simulator device such that each of hammers 110a and 110b may be configured to strike different portions of shell 115 when actuated. In this case, tactile feedback generator 150 may cause a strike to be generated by causing hammer 110a to strike a first portion of shell 115. For example, tactile feedback generator 150 may actuate hammer 110a by moving hammer 110a toward shell 115 until hammer 110a strikes the first portion of shell 115. In aspects, moving hammer 110a toward the first portion of shell 115 may cause hammer 110b to move away from a second portion of shell 115 different from the first portion of shell 115. Tactile feedback generator 150 may be configured to cause another strike to be generated by causing hammer 110b to strike the second portion of shell 115. For example, tactile feedback generator 150 may actuate hammer 110b by moving hammer 110b toward shell 115 until hammer 110b strikes the second portion of shell 115. In aspects, moving hammer 110b toward the second portion of shell 115 may cause hammer 110a to move away from the first portion of shell 115. In this example, heartbeat simulator device 100 may operate to reproduce a heartbeat by first moving hammer 110a toward shell 115 until hammer 110a strikes the first portion of shell 115, pausing for a duration of a first pause, moving hammer 110 toward shell 115 until hammer 110b strikes the second portion of shell 115, then pausing for a duration of a second pause. In aspects, the intensity of the first strike may be different than the intensity of the second strike (e.g., may be higher or lower) to simulate a lub-dub pattern beat, and/or the duration of the first pause may be different from the duration of the second pause (e.g., may be shorter or longer) to simulate a heartbeat. This process may be repeated in accordance with the heartbeat pattern to be reproduced or simulated. In aspects, the intensity of the first and second strike, and/or the lengths of the first and/or second pauses may be determined by the configuration of the heartbeat and/or heartbeat pattern to be reproduced. In this manner, heartbeat simulator device 100 may reproduced or simulate a heartbeat pattern.

In some aspects, more than two hammers may be used. For example, in some embodiments, hammers 110c and 110d may be attached to a single arm (in a similar manner as hammers 110a and 11b are attached to a single arm) and may operate in a similar manner as hammers 110a and 110b. In aspects, having more than two hammers may enhance the control and operation of the beat generation functionality of heartbeat simulator device 100.

Figure 4C:
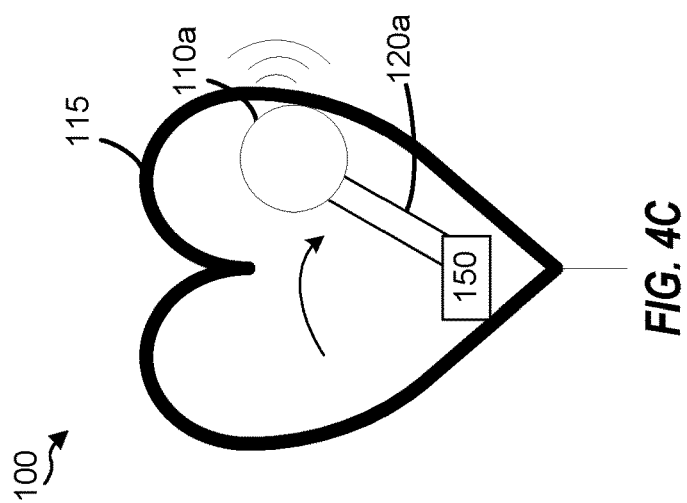
Figure 4B:
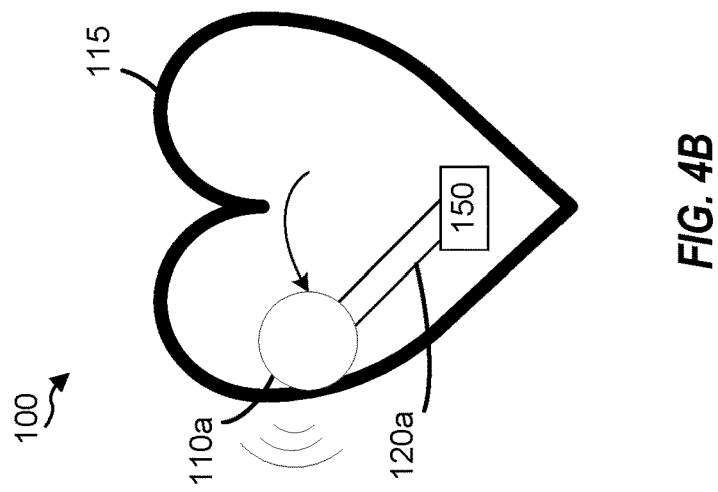
Figure 4A:
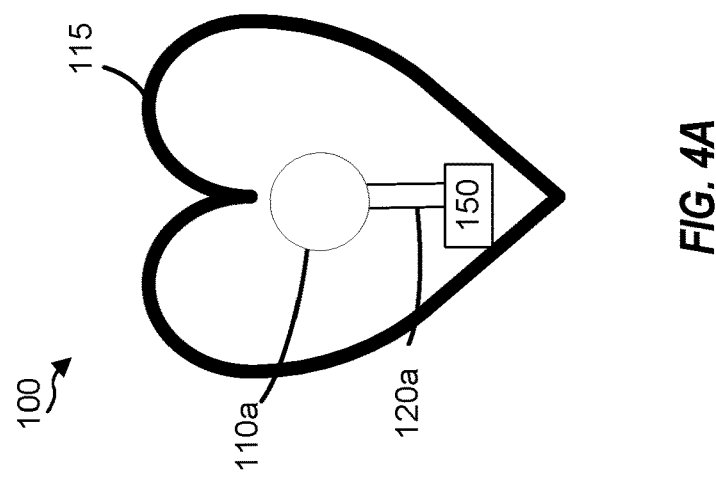

In aspects, such as illustrated in the examples shown in FIGS. 4A-4C, heartbeat simulator device 100 may include a single hammer 110b, and may operate to reproduce a heartbeat by first swinging hammer 110a against the inner surface of shell 115 to cause a first strike against a first portion of the inner surface of shell 115, pausing for a duration of a first pause, swinging hammer 110a against the inner surface of shell 115 to cause a first strike against a second portion of the inner surface of shell 115, then pausing for a duration of a second pause. In aspects, the first portion and the second portion of inner surface 115 may be different portions of inner surface 115 or may the same portion, or may include an overlapping portion between the first and second portion, of inner surface 115. In aspects, the intensity of the first strike may be different than the intensity of the second strike (e.g., may be higher or lower) to simulate a lub-dub pattern beat, and/or the duration of the first pause may be different from the duration of the second pause (e.g., may be shorter or longer) to simulate a heartbeat. This process may be repeated in accordance with the heartbeat pattern to be reproduced or simulated. In aspects, the intensity of the first and second strike, and/or the lengths of the first and/or second pauses may be determined by the configuration of the heartbeat and/or heartbeat pattern to be reproduced. In this manner, heartbeat simulator device 100 may reproduced or simulate a heartbeat pattern.

FIG. 5A-5C are block diagrams illustrating a technique for reproducing a heartbeat pattern tactilely using a striker and slab in accordance with aspects of the present disclosure. As shown, heartbeat simulator device 100 may include a base 535 that is configured to support slab 530, and actuator 220. In aspects, base 535 may be configured to attach to shell 115 of heartbeat simulator device 100. In some aspects, slab 530 may be attached directly to shell 115, or may be attached directly to base 535. In aspects, actuator 220 may include a motor, a solenoid, or any other means of rotating arm 515 and striker 520. In aspects, striker 520 may be attached to actuator 220 using arm 515. In aspects, actuator 220 may include a motor, a solenoid, or any other means of rotating arm 515 and striker 520. In aspects, actuator 220 may be controlled (e.g., actuated) by tactile feedback generator 150. In aspects, striker 520 may or may not be symmetrical about arm 515. In any case, striker 520 may be configured to, upon rotating, make contact with slab 530 to cause a strike. In aspects, generating a heartbeat (e.g., a heartbeat that is part of a heartbeat pattern) may include tactile feedback generator 150 actuating actuator 220 to rotate arm 115 and causing striker 520 to rotate such that at least a portion of striker 520 makes contact with one side of slab 530 causing a strike. The strike may cause a beat that may be perceived as the beat of a heartbeat. In aspects, a lub-dub patterned heartbeat may be generated by causing striker 520 to rotate in one direction, e.g., counter-clockwise from the perspective in front of arm 515 looking into actuator 220, to strike slab 530 to cause a first strike, pausing for a duration of a first pause, causing striker 520 to rotate in another direction, e.g., clockwise from the perspective in front of arm 515 looking into actuator 220, to strike slab 530 to cause a second strike, then pausing for a duration of a second pause. This process may be repeated in accordance with the heartbeat pattern to be reproduced. In aspects, the intensity of the first and second strike, and/or the lengths of the first and/or second pauses may be determined by the configuration of the heartbeat and/or heartbeat pattern to be reproduced. In aspects, both rotations of the lub-dub patterned heartbeat cycle may be in the same directions, rather than in opposite rotations. In this manner, heartbeat simulator device 100 may reproduce or simulate a heartbeat pattern.

FIGS. 6A and 6B are block diagrams illustrating a technique for reproducing a heartbeat pattern tactilely using a flexible shell and expanding actuators in accordance with embodiments of the present disclosure. As shown, heartbeat simulator device 100 may include shell 115, tactile feedback generator 150, and one or more expansion actuators 110 (e.g., actuators 110a-110d). In aspects, actuators 110a-11d may be configured to expand, or cause an expansion, and/or to retract or cause a contraction. For example, actuators 110a-11d may be configured with a solenoid or piston that, when actuated, extends a shaft from a compressed position to an extended position, or retracts from an extended position to a contracted position. In other examples, actuators 110a-110d may include an expandible or compressible bladder that, when actuated, is expanded or is contracted, respectively. In any case, actuators 110a-110d may be connected to shell 115. Shell 115 may comprise a flexible material that is able to expand or contract. In aspects, when one or more of actuators 110a-110d are retracted or expanded, shell 115 is caused to contract or expand, accordingly. In aspects, when generating a beat, tactile feedback generator 150 may actuate any subset of actuators 110a-110d. For example, tactile feedback generator 150 may actuate one, or a plurality of actuators. In some aspects, the specific actuators actuated may be based on a detection of where a user is wrapping their hand around heartbeat simulator device 100. For example, heartbeat simulator device 100 may detect that a user is wrapping their hand around heartbeat simulator device 100 and contact between the user and heartbeat simulator device 100 may be taking place around actuators 110a and 110c, but no contact may be detected around actuators 110b and 110d. In this case, tactile feedback generator 150 may actuate actuators 110a and 110c, but not actuators 110b or 110d. In some aspects, tactile feedback generator 150 may actuate actuators on one side of the heartbeat simulator device 100, and then other half to simulate the lub-dub pattern. For example, tactile feedback generator 150 may first actuate actuators 110c and 110d, may de-actuate actuators 110c and 110d (e.g., to return shell 115 to its natural state), may pause for a duration of a first pause, may actuate actuators 110a and 110b, and may then de-actuate actuators 110a and 110b. In this manner, the lub-dub pattern heartbeat may be generated using one half of heartbeat simulator device 100 for the lub portion and then the other half of heartbeat simulator device 100 for the dub portion. In some aspects, the lub-dub pattern may be generated by actuating all actuators 110a-110d and de-actuating all actuators 110a-110d to cause a lub portion of the heartbeat, pausing for a first duration, then actuating all actuators 110a-110d and de-actuating all actuators 110a-110d again to cause the dub portion of the heartbeat. In some aspects, the lub-dub pattern may be generated by configuring actuators 110a-110d with a snap action. In this case, the lub portion of the lub-dub pattern may be generated by actuating one or more actuators 110a-110d with a snap, which may cause the lub portion of the heartbeat, pausing for a first duration, then de-actuating the one or more actuators 110a-110d with a snap to cause the dub portion of the heartbeat.

In aspects, generating a heartbeat (e.g., a heartbeat that is part of a heartbeat pattern) may include tactile feedback generator 150 actuating actuators 110a-110d to cause a beat to be generated. For example, in some aspects, shell 115 may be naturally in a compressed state. In this case, tactile feedback generator 150 may cause one or more of actuators 110a-110d to expand, e.g., may transmit a signal causing the one or more of actuators 110a-110d to expand. The actuated one or more actuators may be expanded and may cause shell 115 to be expanded to an expanded state (e.g., by pushing shell 115 toward the expanded state). The one or more of actuators 110a-110d may then be retracted (e.g., a signal causing the actuators to be expanded is removed, or a second signal to cause the actuators to retract may be sent to the one or more of actuators 110a-11d), which may cause shell 115 to return to its unexpanded or contracted state. In aspects, this expansion and contraction action may be perceived by a user as a beat of a heartbeat. In another example, shell 115 may be naturally in an expanded state, although may be biased toward a compressed state. For example, actuators 110a-110d may be in an expanded state causing shell 115 to be expanded, but shell 115 may be flexible and/or elastic and may naturally "want" to be in the compressed state. In this case, to generate a beat, tactile feedback generator 150 may cause one or more of actuators 110a-110d to retract, e.g., may transmit a signal causing the one or more of actuators 110a-110d to retract. The actuated one or more actuators may be retracted and may allow shell 115 to go into the compressed state. The one or more of actuators 110a-110d may then be expanded (e.g., a signal causing the actuators to be retracted is removed, or a second signal to cause the actuators to expand is sent to the one or more of actuators 110a-11d), which may cause shell 115 to be pushed into the expanded state. In aspects, this contraction and expansion action may be perceived by a user as a beat of a heartbeat. In aspects, actuators 110a-110d may be configured such that the expansion and/or contraction action is performed with a snapping action, which may help to accentuate the "beat." In this case, rather than expanding or retracting smoothly, actuators 110a-110d may expand or retract with a "jerk" or "snap," instead. In this manner actuators 110a-110d may snap into the expanded or retracted state.

It should be appreciated that, although four actuators are illustrated in the example shown in FIGS. 6A and 6B, this is merely for illustrative purposes and should not be construed as limiting in any way. Indeed, in some embodiments, less or more than four actuators may be used, and in these cases, the techniques disclosed herein may also be applicable.

Figure 8A:
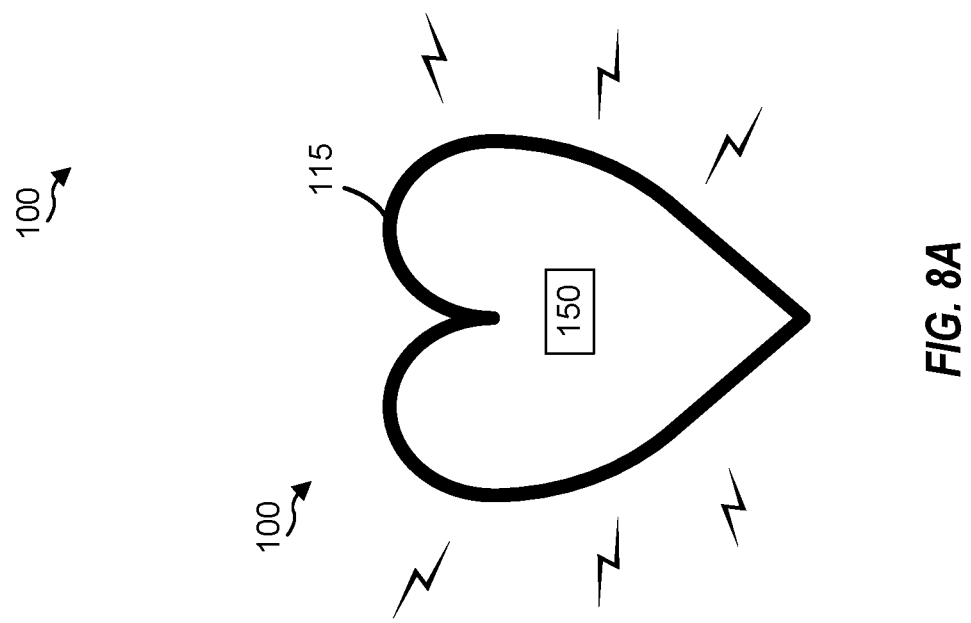
FIG. 8A is a block diagram illustrating a technique for reproducing a heartbeat pattern tactilely using an electric signal in accordance with embodiments of the present disclosure.

FIG. 8A is a block diagram illustrating a technique for reproducing a heartbeat pattern tactilely using an electric signal in accordance with embodiments of the present disclosure. As shown, heartbeat simulator device 100 may include shell 115 and tactile feedback generator 150. In aspects, shell 115 may be configured to deliver a (mild) electric shock or signal to the user to cause a perception of a beat. For example, tactile feedback generator 150 may be configured to cause shell 150, upon activation by a user, to deliver an electric signal to the user that the user may perceive as a beat of a heartbeat. In aspects, at least a portion of shell 115 may include a conductive portion to deliver the electric signal to the user, or shell 115 may be made entirely, or substantially entirely, of a conductive material.

During operation, heartbeat simulator device 100 may operate to reproduce a heartbeat pattern. For example, a heartbeat pattern may be collected (e.g., a heartbeat pattern of a loved one, such as a person or pet). In aspect, the heartbeat pattern may be collected using a heartbeat pattern collector. For example, a mother may collect a heartbeat pattern of her child, born or unborn, or a father or husband may collect his own heartbeat pattern. The collected heartbeat pattern may then be stored and then reproduced by heartbeat simulator device 100 (or stored in an external device such as a mobile device and transmitted to heartbeat simulator device 100) according to aspects described herein.

In aspects, the heartbeat pattern collector may include a stethoscopic sensor configured to obtain a heartbeat pattern from a loved one via the sound of the heartbeat, or via the vibrations caused by the heartbeat through the body of the loved one. In aspects, the heartbeat pattern collector may be configured to collect the heartbeat pattern by detecting electrical signals (e.g., using an electrocardiogram sensor, such as an EKG). In some aspects, the heartbeat pattern collector may include a sonogram configured to collect the heartbeat pattern using sound waves, such as from a baby in the mother's womb. It is noted that the above are merely examples of how the heartbeat pattern collector may be configured to collect the heartbeat pattern from a loved one and should not be construed as limiting in any way. In some cases, other techniques for collecting a heartbeat may be used and the techniques of aspects described herein may be applicable to those techniques.

In aspects, the heartbeat pattern reproduced by heartbeat simulator device 100 may be a simulated heartbeat pattern. For example, in some situations, the loved one may not be available for their heartbeat to be collected. As such, the heartbeat pattern of the loved one may not be able to be obtained from the loved one. For example, the loved one may have passed away, or may be far away or unavailable. In this case, embodiments of the present disclosure provide a way to generate a simulated heartbeat pattern based, at least in part, on at least one physiological characteristic of the loved one, to be reproduced by heartbeat simulator device 100. In these cases, the simulated heartbeat pattern may then be stored in heartbeat simulator device 100 (or stored in an external device such as a mobile device and transmitted to heartbeat simulator device 100 of embodiments) for reproduction according to aspects described herein.

Figure 9:
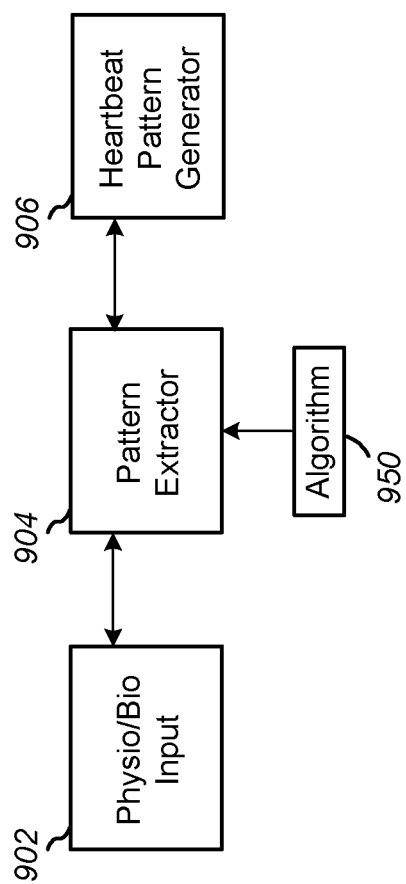
FIG. 9 is a block diagram illustrating an example of a system or device for generating a simulated heartbeat pattern based, at least in part, on at least one physiological characteristic of the loved one in accordance with aspects of the present disclosure.

FIG. 9 is a block diagram illustrating an example of a system or device for generating a simulated heartbeat pattern based, at least in part, on at least one physiological characteristic of the loved one in accordance with aspects of the present disclosure. At 902, at least one physiological characteristic of the loved one may be collected or obtained, and the at least one physiological characteristic may be used as an input. At 904, a pattern extractor may extract at least one pattern from the at least one physiological characteristic of the loved one (e.g., by identifying a pattern in the at least one physiological characteristic and generating a heartbeat pattern from the identified pattern). In aspects, the pattern extractor at 904 may use one or more algorithms 950 to extract the at least one pattern from the at least one physiological characteristic. At 906, a simulated heartbeat pattern may be generated from the extracted pattern to be reproduced by a heartbeat simulator device in accordance with aspects described herein.

In aspects, at least a portion of the process illustrated in FIG. 9 to generate the simulated heartbeat pattern may be performed by heartbeat simulator device 100, by external device 220, by an external server (not shown), or by any combination thereof.

In aspects, the simulated heartbeat pattern generated may be reproduced in a heartbeat simulator device, such as heartbeat simulator device 100, in accordance with aspects described herein. In aspects, the at least one physiological characteristic of the loved one may include any one, or any combination of, physiological characteristic unique to the loved one. For example, the at least one physiological characteristic may include a walking pattern, a blinking pattern, a talking pattern, movements, mannerisms, nervous ticks, speaking pitch variations, timbre variations, speech pattern, accent, voice inflections, etc. In essence, any characteristic associated with the physical presence or physical being of the loved one may be a physiological characteristic. In aspects, the at least one physical characteristic may include visual characteristics of the loved one, such as a physical outline of the loved one's body or part of the body, such as obtained from a picture of the loved one. In aspects, the at least one physical characteristic may include visual a writing pattern (e.g., based on the person's handwriting or based on writing style or use of words, etc.) of the loved one. In aspects, the at least one physical characteristic may be obtained from a picture, a video, a recording of the loved one's voice, a writing of the loved one, etc.

In aspects, the simulated heartbeat pattern may be generated from the at least one physiological characteristic, which may be include one or more physiological characteristics of the loved one. In aspects, the simulated heartbeat pattern may correspond to some pattern of or present on the physiological characteristic. For example, where a physiological characteristic is a person that walks with a slight limp, the heartbeat pattern generated may be one that causes a perception of a slight limp. For example, the simulated heartbeat pattern may include a small dip or increase in intensity cause a perception of the heartbeat similar to what a persons might perceive when watching the limp of the loved one. To illustrate another example, a loved one may be a person that speaks with a particular inflection. In this example, the simulated heartbeat pattern may include a inflections in the intensity of the heartbeats, or may include beats in particular positions of the pattern corresponding to where the inflection of the speech of the loved one spikes, to cause a perception of a heartbeat pattern similar to what a person might perceive when hearing the loved one speak.

In aspects, the simulated heartbeat pattern may be generated so as to be unique to the loved one. For example, one or more algorithms 950 may be applied to the at least one physiological characteristic of the loved one to generate the simulated heartbeat pattern. In aspects, the one or more algorithms 950 may be configured to render the generated simulated heartbeat pattern unique to the loved one. In aspects, any combination of physiological characteristics of the loved one may be used to generate the simulated heartbeat pattern.

In aspects, the at least one physiological characteristic may include a voice recording of the loved one. In these cases, the simulated heartbeat pattern may be generated based on the audio recording, or vide recording, of the loved one. In aspects, the voice of the loved one may be analyzed to extract a pattern in accordance with one or more algorithms (e.g., one or more algorithms 950). For example, the inflections, phase, amplitude, frequency, or any combination thereof, may be analyzed and converted into a simulation of a heartbeat pattern. In some embodiments, the inflection peaks may be taken as the beats, etc., and the inflection troughs may be taken as the roughs in the heartbeat. In some embodiments, the walk of the loved one may be converted into a heartbeat pattern. For example, the gait cycle may be taken as the heartbeat to generate a heartbeat pattern. Any other physiological or biological pattern that may include a cycle or that may include a peak and/or a trough may be taken as a pulse and converted into a heartbeat pattern.

In aspects, the simulated or collected heartbeat pattern may be loaded into the heartbeat simulator device. In aspects, a user may activate the heartbeat simulator device to cause the heartbeat simulator device to reproduce the heartbeat pattern. The user may perceive the heartbeat pattern via the tactile, audio, and/or visual outputs. For example, the user may put a slight squeezing pressure (e.g., wrapping their hand around the heartbeat simulator device of embodiments), may wrap their hand around the heartbeat simulator device without putting any pressure, or may press the heartbeat simulator device against themselves (e.g., may press the device against their chest or any other art of their body) to activate the device. Upon activation, the heartbeat simulator device may reproduce the heartbeat pattern of the loved one (e.g., the collected or simulated heartbeat pattern). The user may perceive the heartbeat pattern (e.g., heartbeat by heartbeat) according to the configuration of the heartbeat pattern, giving the user a user experience that may connect the user with their loved one via the reproduced heartbeat which may be a representation of their loved one's heartbeat. To enhance the user experience, an audio output may be provided. The audio output may be a voice message of the loved one, or music or any other inspiration recording or message, which may be played concurrently with the tactile output representing the loved one's heartbeat. A visual output may also be provided, such as with a light source simulating the beats to further enhance the experience.

In aspects, a user may activate the heartbeat simulator device 100 by interacting with heartbeat simulator device 100. For example, a user may activate heartbeat simulator device 100 by interacting with outer shell 119. In aspects, a user may make contact with outer shell 119 to activate heartbeat simulator device 100. In aspects, a user may wrap their hand around heartbeat simulator device 100 to activate heartbeat simulator device 100. In aspects, the user may squeeze heartbeat simulator device 100 to active heartbeat simulator device 100. In aspects, the user may press heartbeat simulator device 100 against a body part (e.g., against their chest) to activate heartbeat simulator device 100. In aspects, sensors (e.g., touch sensors, pressure sensors, etc.) of heartbeat simulator device 100 may detect the user interaction with the outer shell and may cause heartbeat simulator device 100 to be activated. In aspects, heartbeat simulator device 100 may be activated based on a user interaction when the duration of the user interaction exceeds a threshold duration. For example, a user may squeeze heartbeat simulator device 100, or may press heartbeat simulator device 100 against their chest, for a period of time. If the period of time exceeds the threshold duration, heartbeat simulator device 100 may be activated. Otherwise, if the period of time does not exceed the threshold duration, heartbeat simulator device 100 may not be activated.

In aspects, upon activation, heartbeat simulator device 100 may operate to reproduce a heartbeat pattern, in accordance with aspects described herein. In aspects, a first heartbeat pattern may be reproduced by heartbeat simulator device 100 in response to a first activation (e.g., in response to a user interacting with heartbeat simulator device 100, such as squeezing heartbeat simulator device 100 or pressing heartbeat simulator device 100 against their chest) a first time). The first heartbeat pattern may be associated or correspond to a first loved one (e.g., a first person or a first pet, etc.). In aspects, the user may activate heartbeat simulator device 100 a second time, (e.g., the user may interact with heartbeat simulator device 100, such as squeezing heartbeat simulator device 100 or pressing heartbeat simulator device 100 against their chest) a second time. Heartbeat simulator device 100 may operate to reproduce a second heartbeat pattern in response to the second activation. The second heartbeat pattern may be associated with or correspond to a second loved one (e.g., a second person or a second pet, etc.) different from the first loved one. A similar process may be followed to reproduce a third, fourth, etc., heartbeat patterns corresponding to other loved ones. In this manner, heartbeat simulator device 100 may operate to reproduce a different heartbeat pattern (e.g., from a set of heartbeat patterns, each heartbeat pattern in the set of heartbeat patterns corresponding to a different loved one) each time heartbeat simulator device 100 is activated. Once all heartbeat patterns (e.g., from the set of heartbeat patterns) have been reproduced, heartbeat simulator device 100 may begin to reproduce all heartbeat patterns again, e.g., in sequence, upon a next activation of heartbeat simulator device 100. For example, a mother may store a set of heartbeat patterns in heartbeat simulator device 100, each heartbeat pattern corresponding to each of her children. In aspects, each time heartbeat simulator device 100 is activated (e.g., by interacting with heartbeat simulator device 100, such as by wrapping hands around heartbeat simulator device 100 and squeezing or by pressing heartbeat simulator device 100 against her chest), a different one of the heartbeat patterns is reproduced by heartbeat simulator device 100. In this manner, heartbeat simulator device 100 may operate to give the mother a user experience to memorialize each of her children and fell herself closer to each one of them.

What is claimed is:

1. A device for memorializing a loved one, comprising:
an outer shell comprising a first material, the outer shell defined by an outer surface and an inner surface;
an inner cavity enclosed by the outer shell;
a heartbeat pattern output generator disposed within the inner cavity and configured to:
generate a tactile heartbeat pattern output based on a heartbeat pattern representing at least one physiological characteristic of a loved one; and
cause the tactile heartbeat pattern output to be reproduced at the outer surface of the outer shell when a user interacts with the outer shell; and
a sensor configured to:
detect the user interaction with the outer shell; and
cause, in response to detecting the user interaction with the outer shell, the heartbeat pattern output generator to generate the tactile heartbeat pattern output to be reproduced at the outer surface of the outer shell.

2. The device of claim 1, wherein the at least one physiological characteristic of the loved one includes one or more of: a pattern of heartbeat pulses, a breath pattern, a walking pattern, a characteristic of a voice of the loved one, a speech pattern of the loved one, a blinking pattern of the loved one, or a physiological characteristic that is represented by a pattern of pulses including a high and a low.

3. The device of claim 1, wherein causing the tactile heartbeat pattern output to be reproduced at the outer surface of the outer shell when a user interacts with the outer shell includes:
transferring the tactile heartbeat pattern output from the inner surface to the outer surface.

4. The device of claim 1, wherein generating the tactile heartbeat pattern output based on the heartbeat pattern includes generating a sequence of pulses according to the heartbeat pattern, wherein each pulse is configured to simulate a pulsation of a heart to be reproduced at the outer surface.

5. The device of claim 4, wherein simulating the pulsation of the heart to be reproduced at the outer surface includes one or more of:
causing a hammer to make contact with at least one portion of the inner surface of the outer shell;
causing one or more of an expansion or retraction of a solenoid disposed within the inner cavity to make contact with the inner surface of the outer shell; or
causing an electrical charge to be transmitted to the outer shell of the outer surface to be perceived by the user as the pulsation.

6. The device of claim 4, wherein the expansion of the solenoid disposed within the inner cavity causes the outer shell to expand outwardly, wherein the retraction of the solenoid disposed within the inner cavity allows the outer shell to compress inwardly, and wherein the expansion outwardly and the retraction inwardly creates the pulsation.

7. The device of claim 1, wherein the sensor includes a pressure sensor configured to detect a pressing force by the user, the pressing force including one or more of:
a squeezing force that at least partially envelops the device; or
a pressing force applied against at least one portion of the outer surface of the outer shell of device.

8. The device of claim 1, further comprising:
at least one processor; and
a memory coupled to the at least one processor, wherein the at least one processor is configured to cause the heartbeat pattern output generator to generate the tactile heartbeat pattern output based on the heartbeat pattern, and wherein the memory is configured to store one or more of the heartbeat pattern or processor executable instructions for the at least one processor.

9. The device of claim 8, wherein the heartbeat pattern is one or more of:
preconfigured and stored in the memory; or
dynamically transmitted from a remote device to the device during operations.

10. The device of claim 1, wherein the heartbeat pattern includes a plurality of heartbeat patterns, and wherein the tactile heartbeat pattern output includes a sequence of tactile heartbeat pattern outputs based on the plurality of heartbeat patterns.

11. The device of claim 1, wherein the heartbeat pattern output generator is further configured to one or more:
cause a visual output to be reproduced by the device, the visual output based on the heartbeat pattern; or
cause an audio output to be reproduced by the device, wherein the audio output is one or more of:
based on the heartbeat pattern; or
based on one or more of a voice message representing a voice of the loved one or music.

12. The method of claim 1, wherein the heartbeat pattern is a simulated heartbeat pattern.

13. The device of claim 1, wherein the loved one is one or more of a person or a pet.

14. A method of manufacturing a device for reproducing a heartbeat pattern, the method comprising:
disposing a heartbeat pattern output generator within an inner cavity of a shell of the device, wherein the heartbeat pattern output generator is configured to:
generate a tactile heartbeat pattern output based on a heartbeat pattern representing at least one physiological characteristic of a loved one; and
cause the tactile heartbeat pattern output to be reproduced at a surface of the shell when a user interacts with the shell; and
including a sensor with the device, the sensor configured to:
detect the user interaction with the shell; and
cause, in response to detecting the user interaction with the shell, the heartbeat pattern output generator to generate the tactile heartbeat pattern output to be reproduced at the surface of the shell.

15. The method of claim 14, wherein the at least one physiological characteristic of the loved one includes one or more of: a pattern of heartbeat pulses, a breath pattern, a walking pattern, a characteristic of a voice of the loved one, a speech pattern of the loved one, a blinking pattern of the loved one, or a physiological characteristic that is represented by a pattern of pulses including a high and a low.

16. The method of claim 14, further comprising one or more of:
including, with the heartbeat pattern output generator, a hammer configured to make contact with at least a portion of the shell to simulate a pulsation of a heart to be reproduced at the surface;
including a solenoid disposed within the inner cavity configured to make contact with the inner surface of the outer shell to simulate the pulsation of the heart to be reproduced at the surface, wherein expansion of the solenoid causes the shell to expand outwardly, wherein retraction of the solenoid allows the shell to compress inwardly, and wherein the expansion outwardly and the retraction inwardly create the pulsation; or
configuring the shell to generate an electrical charge to be perceived by the user as the pulsation of the heart.

\* \* \* \* \*